United States Patent [19]

Bühler

[11] Patent Number: 4,564,951
[45] Date of Patent: Jan. 14, 1986

[54] COOLING ARRANGEMENT OF A BOTTOM ELECTRODE FOR A DIRECT-CURRENT ARC FURNACE

[75] Inventor: Karl Bühler, Nussbaumen, Switzerland

[73] Assignee: BBC Brown, Boveri & Company Limited, Baden, Switzerland

[21] Appl. No.: 633,987

[22] Filed: Jul. 24, 1984

[30] Foreign Application Priority Data

Jul. 28, 1983 [CH] Switzerland .................. 4136/83

[51] Int. Cl.⁴ .................................. H05B 7/20
[52] U.S. Cl. ............................ 373/108; 373/72
[58] Field of Search ............ 373/108, 72, 36, 37, 373/71, 101

[56] References Cited

U.S. PATENT DOCUMENTS 4,032,704 6/1977 Stenkvist .................... 373/108

Primary Examiner—Roy N. Envall, Jr.
Attorney, Agent, or Firm—Oblon, Fisher, Spivak, McClelland & Maier

[57] ABSTRACT

A direct-current electric arc furnace for melting metals including a furnace vessel and at least a pair of electrodes, wherein a bottom electrode is mounted in the bottom of the furnace vessel. In order to be able to provide good cooling for the bottom electrode, a connecting piece directly or indirectly cooled is provided in contact with the bottom electrode and serves as a contact sleeve. The contact surfaces of the connecting piece expand conically in the direction of the furnace vessel bottom. By pairing the external truncated cone of the bottom electrode with the internal truncated cone of the connecting part, a proper electric and thermal contact is made between the two parts. In addition, the contact sleeve is provided with cooling ducts for a liquid cooling system which further enhances the cooling effect.

6 Claims, 1 Drawing Figure

COOLING ARRANGEMENT OF A BOTTOM ELECTRODE FOR A DIRECT-CURRENT ARC FURNACE

BACKGROUND OF THE INVENTION

1. Field of the Invention

The invention relates to an electric furnace, and more particularly to a d.c. arc furnace having a cooled bottom electrode and including at least one connecting piece located below the bottom of the furnace vessel.

2. Description of the Prior Art:

A furnace of above-noted type is known, for example, from Swiss Patent Specification No. 452,730.

Progress in the development of semi-conductor components in recent years has given an impetus to an increasing use of direct-current arc furnaces in the iron and steel industry for smelting, predominantly for smelting electric-furnace steel.

The construction and mode of action of directcurrent arc furnaces are known, for example, from the journal "Stahl und Eisen", 103 (1983) No. 3, of Feb. 14, 1983, pages 133 to 137.

For optimizing the electrical or thermal conditions, it has proven to be advantageous in a directcurrent arc furnace to form the arc between one or more electrode(s) located above the melting material and the melting material itself. As the return line of the direct current, at least one electrode in the bottom of the furnace and in contact with the melt, namely the bottom electrode, is provided.

The bottom electrode is exposed to continuous, very high thermal stresses, for which materials having a high softening and melting point, for example graphite, are suitable. However, when carbon electrodes are used, the melt is carburized on the one hand. This is undesirable, however, in particular in the production of low-carbon steels. On the other hand, the carbon electrode is consumed, whereby the furnace bottom is weakened and the electric power transfer can be adversely affected.

According to the solution proposed by the above noted Swiss Patent Specification No. 452,730, bottom electrodes are used, but have a zone also having the same chemical contents as the melt itself in contact with the melt. In this case, cooling takes place in the end zone, facing away from the furnace vessel, of the bottom electrode by convection with air, this end zone consisting of a metal having good heat-conducting and current-conducting properties, for example of copper. This is a so-called two-component bottom electrode.

On the one hand, this air-cooled two-component bottom electrode avoids, in the event of a break-out of the furnace hearth, the possibility of molten metal coming into contact with the liquid of a cooling arrangement or with current-bearing components of the bottom electrode below the furnace vessel bottom, and thus from the start eliminates the risk of unforeseen serious consequences. On the other hand, a relatively weak cooling effect must be accepted, which is by no means up to the demands which a continuously operating bottom electrode in industrial use must meet, namely for the following reasons:

The operation of an arc furnace is essentially characterized five process stages:

| | |
|---|---|
| the charging phase | no power, low temperature |
| the fusion phase | high power, high temperature |
| the refining or purification phase | low power; high temperature |
| the tapping phase | no power; high temperature |
| the non-productive time phases | no power; medium-to-low temperature |

In particular the dissipation heat, generated in the fusion phase by the current, causes a greater heat flux in the bottom electrode, in particular in the direction of the furnace vessel bottom. Accordingly the intensity of the heat arising can vary within a relatively wide range between the charging phase and the refining or purification phase. However, this also means that the temperatures prevailing in the cooled zone of the bottom electrode can likewise vary within a relatively wide range. With a constant length of the bottom electrode, the differing heat flux in the bottom electrode can produce varying temperature differences between its cooled zone and its zone in contact with the melt. With more heat arising, however, there is no greater temperature difference, since the electrode cannot be warmer on the inside than the temperature of the melt, or, in other words, more heat can be transported only if the bottom electrode becomes shorter, that is to say melts off.

If, as is the case in a wide range with air cooling, the temperature of the cooling surface is substantially higher with more heat arising than with less heat arising, the greater quantity of heat can only be removed if the length of the bottom electrode is shortened even more, that is to say even more of the bottom electrode melts off. It follows that the change in position of the liquid/solid boundary layer between the melt and the bottom electrode extends over a relatively great length, as viewed in the axial direction. This change in position can manifest itself, on the one hand, by the bottom electrode "growing into" the melt or, as already stated, in a melting-off process in the direction of the furnace vessel bottom.

The process described above impairs the durability of the bottom electrode to a considerable extent and leads to premature destruction of the refractory lining, surrounding the bottom electrode, of the furnace vessel bottom. To ensure that the bottom electrode is operable at all under such unfavorable operating conditions, it must be correspondingly oversized. This in turn has an adverse effect on the dissipation power.

Furthermore, the cooler output must be adapted to the operational requirements. On the one hand, this can be increased by oversizing an air cooler. However, this would give unsatisfactory results in the long run.

On the other hand, liquid cooling would be outstandingly suitable for cooling a bottom electrode. In this case, however, appropriate protective measures must be taken to prevent liquid metal from coming into contact with cooling liquid.

SUMMARY OF THE INVENTION

Accordingly, the objects of this invention are to provide a novel electric furnace of the type mentioned initially in which the bottom electrode is cooled to an optimum degree, the cooling device can be economically produced and is easily replaced and offers a high degree of operational reliability.

These and other objects are achieved according to the invention by providing a novel electric furnace, in particular a direct-current arc furnace for melting metals, having a cooled bottom electrode including at least one connecting piece which is located below the furnace vessel bottom, wherein the connecting piece is constructed as a directly or indirectly cooled contact sleeve having contact surfaces which expand conically in the direction of the furnace vessel bottom and wherein the contact sleeve envelops the end part of the bottom electrode, facing away from the furnace vessel interior.

It is an essential feature of the invention that the connecting piece is constructed as a contact sleeve and the contact area(s) of the contact sleeve expand(s) conically in the direction of the furnace vessel bottom.

By pairing the external truncated cone of the bottom electrode with the internal truncated cone of the contact sleeve, proper electric and thermal contact is achieved between the bottom electrode and the contact sleeve.

In a further development of the invention, cooling ducts, closed towards the electrode, are arranged in the contact sleeve for a liquid cooling system. This achieves intensive cooling of the bottom electrode which is further reinforced by using copper as a very good heat-conducting material for the contact sleeve and by pulling both parts into each other by means of screw force. Liquid cooling takes place only in the connecting piece and not in the electrode itself. This indirect type of cooling the bottom electrode offers extensive safety in the case of a furnace vessel break-out since the liquid cooling is decoupled from the bottom electrode itself. Melting of the contact sleeve is thus largely countered or, if the coolant flow is of a sufficiently strong magnitude, melting is even made impossible.

According to a further development of the invention, at least one perforation is provided in the front wall of the connecting piece. This considerably facilitates installation and removal of the bottom electrode since neither the connecting piece nor the electric feed lines need be removed. A consumed bottom electrode is ejected from the furnace vessel bottom, from outside into the furnace vessel interior, in a simple manner by placing, for example, an ejection ram through the perforation in the connecting piece directly onto the front face of the bottom electrode and exerting on the bottom electrode a force required for ejection.

According to still a further development of the invention, a shielding roof arranged between the furnace vessel bottom and the connecting piece is provided as protection of the connecting piece of the bottom electrode against any liquid metal penetrating through the furnace vessel bottom.

This prevents the metal emerging in the case of a break-out of the furnace vessel bottom in the vicinity of the bottom electrode reaching, that is to say being diverted to, the liquid-cooled parts of the bottom electrode.

In addition, the shielding roof is used for protecting the feed pipes and hoses for the cooling device and for the electric power feed lines and the like. The shielding roof preferably consists of metal, is of a truncated-cone-like construction and provided with an opening i.e., the shielding roof is open towards the bottom and firmly joined to the furnace vessel bottom and the bottom electrode projects through the opening in the shielding roof. In addition, the upper surface of the shielding roof is provided with a covering of refractory material. This structural arrangement makes it possible for the protection device to have a simple construction and also ensures that the cooling device and the electric connecting parts of the bottom electrode are adequately protected even with greater quantities of liquid metal emerging from the furnace vessel bottom.

As a further protective measure, according to a further development of the invention, a temperature monitoring system of a type known per se for monitoring the temperature of the bottom electrode itself, for example by means of thermocouples such as bi-metallic thermostats or similar, is provided, by which arrangement penetration of the melt directly into or at the bottom electrode is detected and measures such as, for example, stopping of the coolant, can be immediately initiated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DISCRIPTION OF THE PREFERRED EMBODIMENTS

Figure 1:
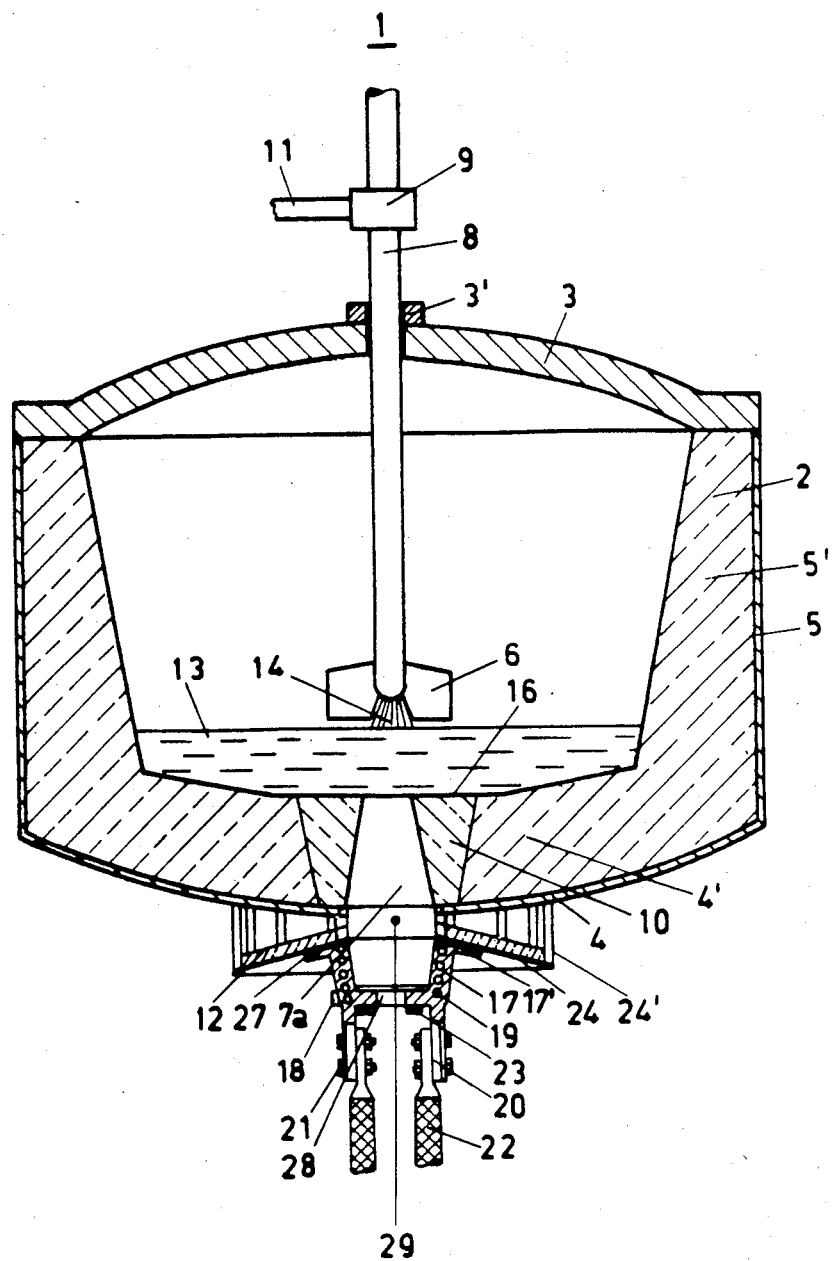
FIG. 1 is a vertical cross section view through an electric furnace including the bottom electrode according to the invention.

FIG. 1 shows the art furnace 1 including the furnace vessel 2 and furnace cover 3, the furnace vessel 2 consisting of the vessel bottom 4, the vessel wall 5, the refractory lining 4' of the furnace bottom 4 and the refractory lining 5' of the vessel wall 5. Above the molten bath 13, a carbon electrode 8 is arranged projecting through an opening in the furnace cover. For cooling the electrode 8 a cooling ring 3' is provided. The electrode 8 is held in a holder 9 of an electrode support arm 11. The electrode support arm 11, in turn, is connected with an electrode regulating device, not shown in FIG. 1.

In the furnace vessel 5, 5', there is a furnace door 6 and an arc 14 is formed between the electrode 8 and the molten bath 13.

In the vessel bottom 4, 4', the bottom electrode 7a according to the invention can be seen. Electrode 7a is enclosed sleeve-like by the part 10 of refractory material. In the illustrative embodiment according to FIG. 1, the bottom electrode 7a has a conical shape which tapers in the direction of the vessel interior and which extends from the furnace vessel bottom 4 to the furnace hearth area 16. In contrast to the tapering shape of the bottom electrode 7a, the part 10 expands in the direction of the vessel interior. The bottom electrode 7a is held below the furnace vessel bottom 4 by a water-cooled connecting piece 17 which is constructed as a contact sleeve and which is used simultaneously for connecting the electic power supply. The bottom electrode 7a is fastened by means of a screw connection 23 to the front face of the connecting piece 17. The conically constructed contact faces of the bottom electrode 7a rest against the inner contact of the connecting pieces 17 which are also conical and expand towards the furnace bottom 3, which produces a good electric connection and heat conduction between the two parts 7a and 17. At the connecting piece 17, contact lugs 20 are arranged which are constructed of one piece with the piece 17 serving as a contact sleeve.

FIG. 1 shows a part of the electric power supply cable 22 which is connected by means of the screw connection 21 to the contact lugs 20 of the connecting piece 17. The connecting piece 17 is provided with cooling ducts 19 and with a cooling duct inlet branch 18. A cooling liquid, primarily water, is fed through the inlet branch 18 to the cooling ducts 19. It flows upwards through the cooling ducts 19 of the connecting piece 17, arranged in the form of a spiral, and thus cools the bottom electrode 7a in an indirect manner. The cooling liquid outlet branch of the connecting piece 17 is located at the same level as the inlet branch 18 and therefore can not be seen in FIG. 1.

The bottom electrode 7a is held by means of a fastening part which consists of a metallic truncated-cone-like shielding roof 24 and vertical holding cross-members 24'. The shielding roof 24 is arranged to be at least essentially central with reference to the furnace axis and open towards the bottom and is firmly connected to the furnace vessel bottom 4 by means of the holding cross-members 24'. The bottom electrode 7a projects through the opening of the shielding roof 24 and is supported on the contact sleeve, the connecting piece 17 being fastened to the underside of the shielding roof 24 with is insertion of an electrically insulating intermediate layer 27.

Should it be necessary to remove the bottom electrode, only the screw connection 23 is loosened. A bolt, not shown in FIG. 1, of an ejection device is placed onto the front face, turned away from the interior of the vessel, of the bottom electrode 7a through the perforation 28 in the front face 28 of the connecting piece 17 and a force as required for the ejection process is applied to the bottom electrode 7a and the part 10. In this manner, the bottom electrode 7a and the part 10 enveloping it can be easily removed from the outside into the furnace vessel interior. Since, in contrast with the front face of the bottom electrode facing the melt, the face against which the ejection ram rests is accurately defined, the ejection of the bottom electrode from the furnace vessel bottom 4, 4' can be repeated in every case with good reproducibility.

Obviously, numerous modifications and variations of the present invention are possible in light of the above teachings. It is therefore to be understood that within the scope of the appended claims, the invention may be practiced otherwise than as specifically described herein.

List of designations

1: Arc furnace
2: Furnace vessel
3: Furnace cover
3': Electrode cooling ring at the furnace cover 3
4: Furnace vessel bottom
4': Refractory lining of the furnace vessel bottom 4
5: Vessel wall
5': Refractory lining of the vessel wall 5
6: Furnace door
7a: Bottom electrode, of one piece
7b: Bottom electrode, of one piece
7c: Bottom electrode, of one piece
7d: Two-component bottom electrode
8: Carbon electrode
9: Holder for the electrode 6
10: Refractory sleeve in refractory lining 4' of the furnace bottom 4
10': Refractory sleeve in refractory lining 4'
11: Electrode support arm
12: Refractory covering
13: Molten bath
14: Arc
15: Refractory filling in bottom electrode 7b,c
16: Furnace hearth area
17: Connecting piece
18: Coolant inlet branch
19: Cooling ducts
20: Power-connection lugs
21: Screw connection between lug 20 and cable 22
22: Electric connecting line
23: Screw connection between electrode 7a and electrode holding piece 17
24: Support structure, shielding roof
25: Support structure, holding cross-members
26: Mushroom-shaped deposition of slag on furnace hearth area 16
27: Insulating layer
28: Opening in the front face of the connecting piece 17
29: Temperature sensor in the bottom electrode 7a
30: Zone of least temperature gradient in the furnace hearth area 16
31: The part facing the molten bath of the two-component electrode 7d
32: Cu part of the two-component electrode 7d
Length
$d_1$: Diameter of the bottom electrode 7a,b,c, in the area of the furnace vessel bottom 4.

What is claimed as new and desired to be secured by Letters Patent of the United States is:

1. A direct-current arc furnace for melting metal, comprising:
   a furnace vessel having a bottom;
   at least a pair of electrodes, including a bottom electrode mounted in the bottom of said vessel, said bottom electrode having an end part projecting from the furnace vessel;
   a connecting piece mounted exterior of said vessel bottom for holding at least a portion of said end part of the a bottom electrode below the vessel bottom, said connecting piece having an interior cavity extending in the direction of the vessel bottom to define contact surfaces substantially enveloping and fittingly, detachably contacting said portion of said end part of said bottom electrode; and
   means for cooling said connecting piece;
   wherein said connecting piece serves as a cooling contact sleeve for said end part of said bottom electrode.

2. A furnace according to claim 1, wherein said cooling means comprises:
   cooling ducts, provided in contact with said connecting piece for liquid cooling of said connecting piece and indirect cooling of said bottom electrode.

3. A furnace according to claims 1 or 2, wherein the connecting piece comprises copper and is connected to the bottom electrode by means of a screw connection.

4. A furnace according to claims 1 or 2, comprising:
   at least one perforation provided in a front wall of the connecting piece.

5. An electric furnace according to claims 1 or 2, comprising:
   means for monitoring temperature provided in the bottom electrode.

6. A furnace according to claim 1, wherein said connecting piece comprises an electrically conductive material, and means are provided for applying power to said end part of said bottom electrode via said connecting piece.

* * * * *